(12) United States Patent
Futernik

(10) Patent No.: US 6,435,273 B1
(45) Date of Patent: Aug. 20, 2002

(54) DEVICE FOR AIR TEMPERATURE CONTROL IN A VEHICLE

(76) Inventor: Vladlen Futernik, 40 Mason St., Metuchin, NJ (US) 08870

( * ) Notice: Subject to any disclaimer, the term of this patent is extended or adjusted under 35 U.S.C. 154(b) by 0 days.

(21) Appl. No.: 09/597,709

(22) Filed: Jun. 21, 2000

Related U.S. Application Data

(63) Continuation-in-part of application No. 09/210,695, filed on Dec. 14, 1998, now abandoned.

(51) Int. Cl.$^7$ ............................................. F25B 29/00
(52) U.S. Cl. ..................... 165/202; 165/42; 165/43; 62/434; 62/435; 62/244; 62/525; 62/229
(58) Field of Search ........................... 165/42, 43, 202; 62/434, 435, 525, 244, 229

(56) References Cited

U.S. PATENT DOCUMENTS

| | | | | |
|---|---|---|---|---|
| 964,941 A | * | 7/1910 | Seymour | 165/163 |
| 1,139,549 A | * | 5/1915 | Lovekin | 165/163 |
| 1,822,123 A | * | 9/1931 | Birdseye et al. | 62/434 |
| 1,891,713 A | * | 12/1932 | Jordan et al. | 62/434 |
| 1,961,069 A | * | 5/1934 | Murphy | 62/434 |
| 2,017,579 A | * | 10/1935 | Anderson | |
| 2,068,475 A | * | 1/1937 | Stump, Jr. | |
| 2,106,515 A | * | 1/1938 | Wanamaker | |
| 2,176,282 A | * | 10/1939 | Triplett | 165/163 |
| 2,220,595 A | * | 11/1940 | Andersen | 62/525 |
| 2,221,423 A | * | 11/1940 | Reinhardt | 62/525 |
| 2,787,129 A | * | 4/1957 | Evans | |
| 2,950,092 A | * | 8/1960 | Di Niro | 165/150 |
| 3,028,149 A | * | 4/1962 | Pellmyr | 165/180 |
| 3,059,449 A | * | 10/1962 | Dilliner | 165/43 |
| 3,147,800 A | * | 9/1964 | Tadewald | 165/150 |
| 3,670,522 A | * | 6/1972 | Bresin | 62/434 |
| 3,753,462 A | * | 8/1973 | Burger | |
| 3,990,505 A | * | 11/1976 | Davenport | 165/43 |
| 5,704,221 A | * | 1/1998 | Lego | 62/825 |
| 5,904,052 A | * | 5/1999 | Inoue et al. | 165/43 |
| 6,105,572 A | * | 8/2000 | Shaffer et al. | |

FOREIGN PATENT DOCUMENTS

| | | | | |
|---|---|---|---|---|
| DE | 20 44958 | * | 4/1971 | 165/42 |
| DE | 21 58408 | * | 5/1972 | 165/42 |
| DE | 2101955 | * | 7/1972 | 165/43 |
| DE | 22 04950 | * | 8/1973 | 165/43 |
| GB | 2032091 | * | 4/1980 | 165/163 |
| JP | 59-170637 | * | 9/1984 | |
| JP | 0217095 | * | 9/1987 | 165/150 |
| JP | 2-213680 | * | 8/1990 | |
| JP | 404068297 | * | 3/1992 | 165/150 |
| JP | 58-211907 | * | 12/1998 | |

* cited by examiner

Primary Examiner—John K. Ford
(74) Attorney, Agent, or Firm—I. Zborovsky

(57) ABSTRACT

A device for air temperature control in a vehicle has a unit forming a first circuit for circulation of an coolant, a unit forming a second circuit for circulation of a refrigerant, a unit for connecting the first circuit with an engine for heating the coolant, a unit for providing a heat exchange between the second circuit and the first circuit for cooling the coolant, a single air temperature regulating element, and a unit for alternatively connecting the first a unit to the air temperature regulating element so that when the coolant is heated from the engine and supplied through the first a unit the air temperature regulating element heats air in the vehicle, or connecting the second a unit with the common air temperature regulating element so that when the coolant in the first circuit is cooled by heat exchange with the refrigerant of the second circuit and the cooled coolant is supplied to the air temperature regulating element to cool air in the vehicle, and a heat exchanger which provides a heat exchange between the coolant of the first circuit and the refrigerant of the second circuit, the heat exchanger including a container through which the coolant is passed, and a plurality of tubes extending through the container and through which the refrigerant is passed, the tubes being arranged so as to form a plurality of group of tubes with the groups spaced from one another in a vertical direction and not connected with one another, while the tubes within each group are connected in series with one another.

1 Claim, 3 Drawing Sheets

DEVICE FOR AIR TEMPERATURE CONTROL IN A VEHICLE

CROSS-REFERENCE TO A RELATED APPLICATION

This application is a continuation-in-part of U.S. patent application Ser. No. 091210,695 filed on Dec. 14, 1998 now abandoned.

BACKGROUND OF THE INVENTION

The present invention relates to a device for controlling air temperature in a vehicle.

Devices of the above mentioned general type are known in the art. Air controlling or air conditioning devices are known which use an evaporator and a fan supplying the cooled air and located in the vehicle compartment under a dashboard. In this construction the air guides are separated from the heater. Such a location of the air conditioning device distorts comfort layers in the vehicle space by introducing a concentrated mass of cooled air into the central part of the space which settles in the lower part of the space. Hot air is displaced to the sealing. The separation of the air conditioning unit and the heating unit are not advisable, also due to increased costs.

When a car travels at high speed on a hot summer day, it will require considerable refrigerating capacity to keep the interior at a comfortable temperature. The same car, traveling on a cold winter day, will require considerable heating capacity.

Another automobile air conditioner uses a refrigerating system driven by the car engine to furnish cooling action. Warm engine coolant usually provides heat to the passenger compartment when needed. Conditioning the air in the interior of a car involves heating and cooling. The heat to warm the passenger is usually provided by circulating of hot coolant through a heater core. The engine water pump forces the warm coolant through the heater hoses and inside of the heater core. When cooling is needed, the air conditioning system to is brought into operation. It uses an evaporator inside a plenum chamber to cool the air circulated through the passenger compartment. The car engine, using a belt, drives the compressor to pump through the system.

Some devices of the above mentioned general type are disclosed in your U.S. Pat. No. 2,017,579; 2,068,475; 2,106, 515; 2,787,129; 3,059,449; 3,753,462; 3,990,505; and German patents numbers 2,044,958; 2,158,408, 2204950 and 2,101,955.

SUMMARY OF THE INVENTION

Accordingly, it is an object of the present invention to provide a device for controlling air temperature in a vehicle, which avoids the disadvantages of the prior art.

In keeping with these objects and with others which will become apparent hereinafter, one feature of present invention resides, briefly stated, in a device which has a means forming a first circuit for circulation of an coolant, means forming a second circuit for circulation of a refrigerant; means for connecting said first circuit with an engine for heating the coolant, means for providing a heat exchange between said second circuit and said first circuit for cooling said coolant; a single air temperature regulating element; and means for alternatively connecting said first means to said air temperature regulating element so that when said coolant is heated from the engine and supplied through said first means said air temperature regulating element heats air in the vehicle, or connecting said second means with said common air temperature regulating element so that when said coolant in said first circuit is cooled by heat exchange with the refrigerant of the second circuit the cooled coolant is supplied to said air temperature regulating element to cool air in the vehicle, and a heat exchanger is provided for performing a heat exchange between the coolant of the first circuit and the refrigerant of the second circuit, wherein the heat exchanger is formed as a container in which the refrigerant is supplied, with a plurality of pipes extending through said container and containing the coolant, wherein the pipes are arranged so that there are a plurality of groups of pipes with said groups of pipes spaced from one another in a vertical direction and with the pipes of each group spaced from one another in a horizontal direction, with the pipes in each group connected with one another, and the groups of the pipes not connected with one another.

When the device is designed in accordance with the present invention it eliminates the disadvantages of the prior art and provides for the highly advantageous results in improvement of a comfortability of air heating or cooling and reducing the costs of the system of air temperature control.

The present invention excludes evaporator. A heater-exchanger is installed instead, and is formed in a special inventive way to provide efficient and reliable operation of the system.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
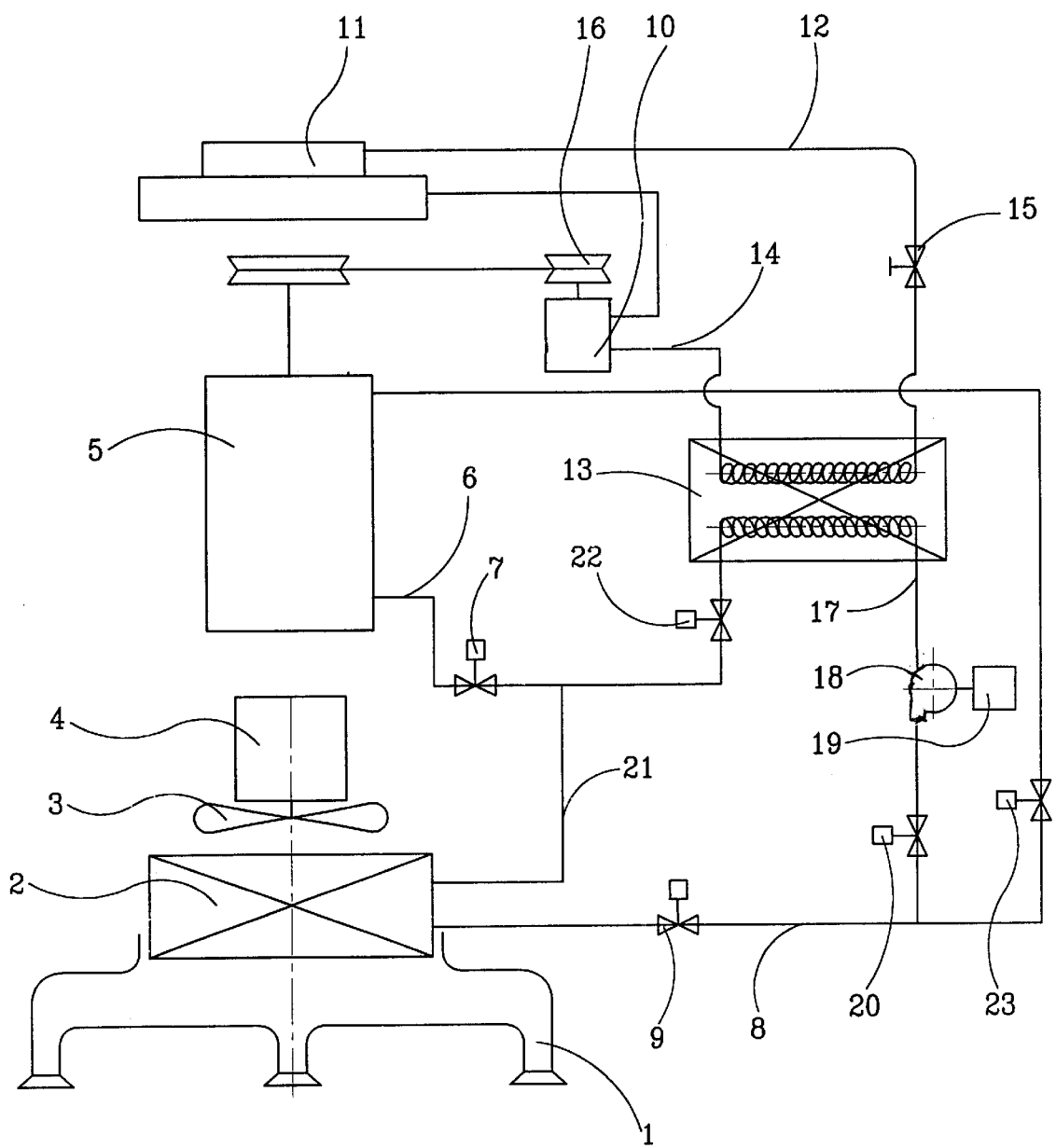
FIG. 1 is a view schematically showing a device for air temperature control in a vehicle.
Figure 2:
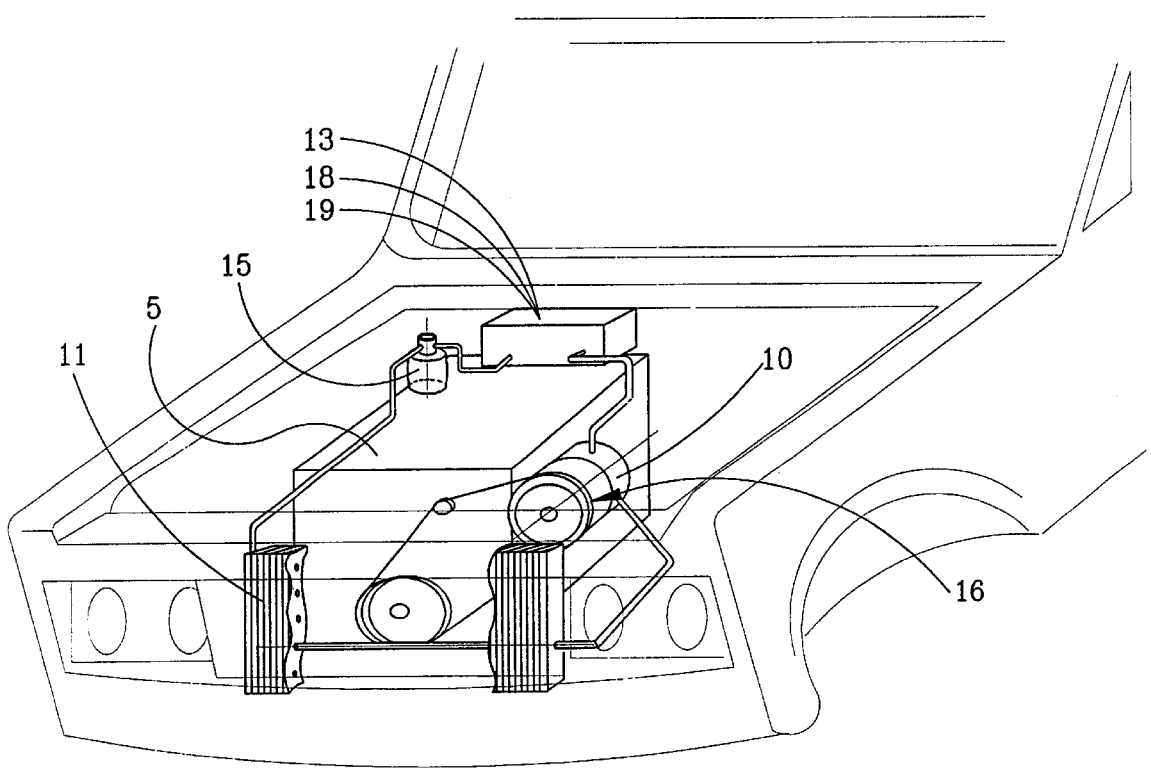
FIG. 2 is a view showing the inventive device mounted in a vehicle.

A device for air temperature control in a vehicle has an air outlet unit provided in several outlets and identified with reference numeral 1. A known heater core 2 is located before an inlet of the unit 1, and a blower 3 which is driven by a motor 4 is located behind the heater core so as to blow air with a temperature provided by the heater core into the air outlet unit 1.

A vehicle engine 5 is connected by a hot coolant supply conduit 6 with the heater core 2. A valve 7 is located between the conduit 6 and the heater core 2. A return conduit 8 connects the outlet of the heater core 2 to the engine 5 and is provided with a control valve 23. A valve 9 controls a portion of the hot coolant in the heater core 2 for temperature control.

The device further has a compressor 10 which supplies a vaporous refrigerant to a condenser 11. The thusly liquefied refrigerant is supplied through a refrigerant supply conduit 12 into a heat exchanger 13 in which it cools the coolant and is returned through a return conduit 14. A expansion valve 15 Is provided in the refrigerant supply conduit 12. A thermostat 25 controls an operation time of the compressor and therefore a cooling operation of the system.

The coolant which is cooled in the heat exchanger 13 in heat exchange with the refrigerant is supplied through the cold coolant supply conduit 17 by a water pump 18 operated by a motor 19, to the heater core 2. A valve 20 is provided in the conduit 17. An coolant return conduit 21 connects an outlet of the heater core 2 with the heat exchanger 13 and is provided with a valve 22. A heater core valve 9 controls a portion of the hot coolant in the heater core for temperature control.

The device for controlling air temperature in a vehicle in accordance with the present invention operates in the following manner.

When it is necessary to heat air in vehicle space, the valves 20 and 22 are closed and the valves 7 and 23 are open. The coolant heated by the engine 5 is supplied through the conduit 6 into the heat core and heats the same, and the blower 3 blows the air through the heated heater core 2 into the air outlet unit 1 so as to heat the inner space of the vehicle. The slightly cooled coolant is returned back to the engine 5 through the conduit 8.

When it is necessary to cool air in the vehicle space, the valves 7 and 23 are closed and the valves 20 and 22 are open. The coolant which is cooled in the heat exchanger 13 is supplied through the conduit 17 into the heater core 2 and cools the same, and the blower 3 blows cold air into the air outlet unit 7, whereupon the slightly heated air coolant is returned back into the heat exchanger 13 through the conduit 21.

Figure 3A:
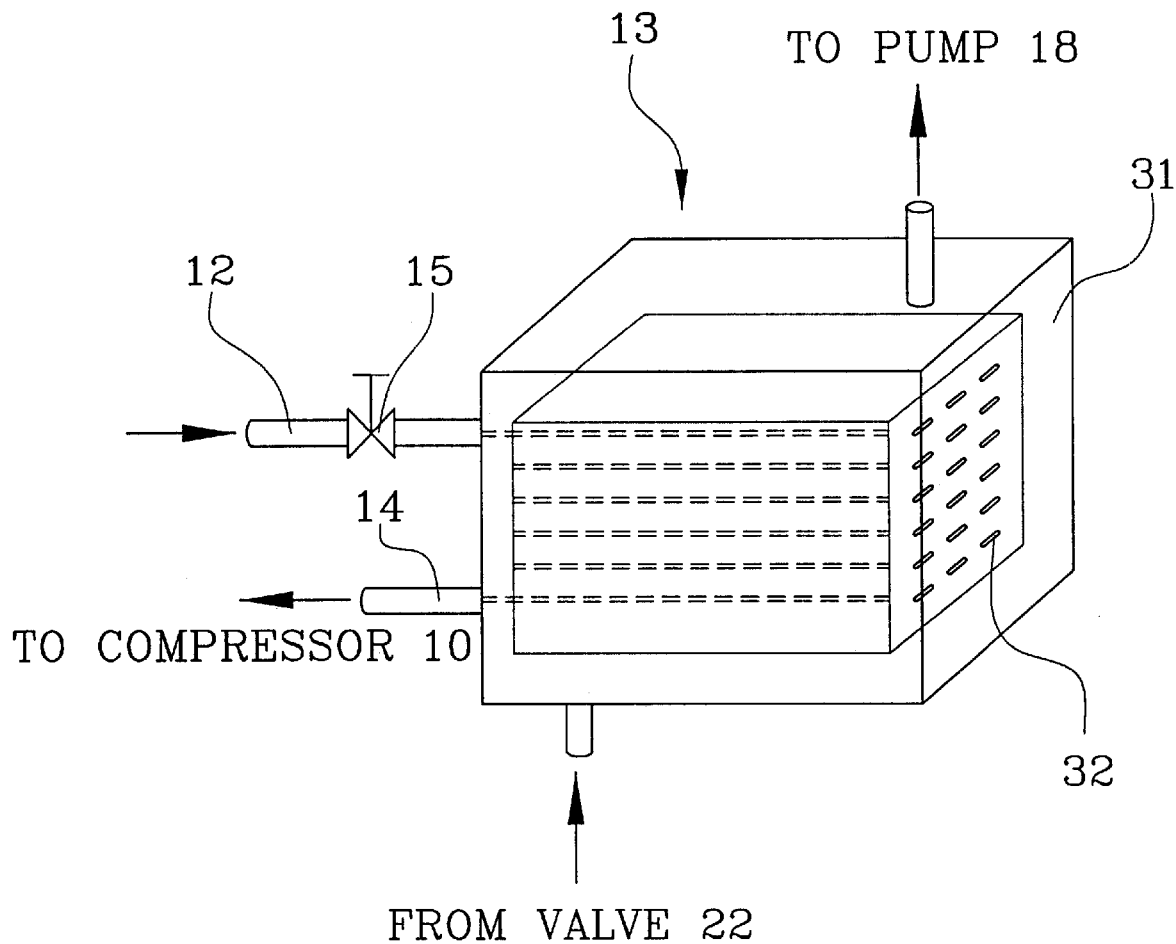
FIGS. 3A & 3B are views showing a heat exchanger of the inventive device for air temperature control in a vehicle.
Figure 3B:
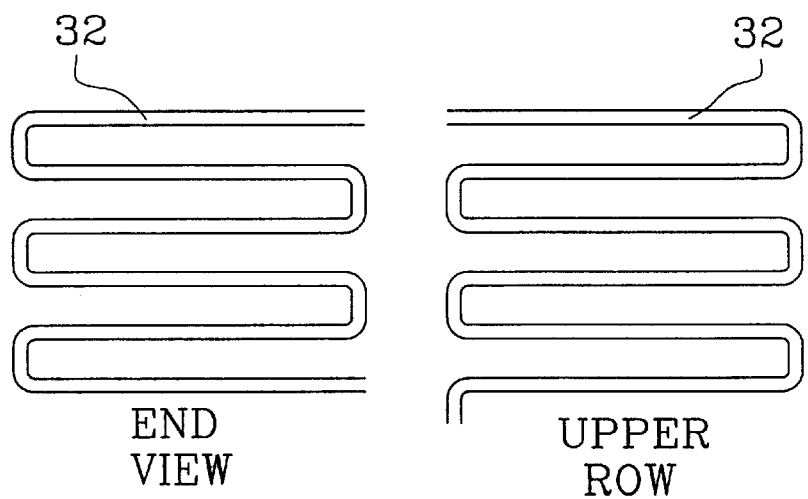

FIG. 3 is a view specifically shows a heat exchanger in accordance with the present invention. A heat exchanger 13 has a container which is identified as a whole with reference numeral 31. The liquified refrigerant is supplied through the refrigerant supplied conduit 12 with the open expansion valve 15 into the interior of the container 31. A plurality of tubes 32 extend in the interior of the container 31 and have for example in two opposite walls including a left wall and the right wall in the drawings connected with one another by a longitudinal connecting elements. The tubes can have any cross-section, and also can be provided with a flattened cross-section as shown in the drawings. The tube 32 are arranged so that they form a plurality of groups of the tubes which are spaced from one another in a vertical direction. As shown in the drawings, there are six tubes of the groups spaced from one another in a vertical direction. Within each group of the tubes, there are also several tubes, for example three tubes as shown in the drawings. The tubes within each group are connected with one another in series, for example meanderingly as shown in the drawings. The groups of the tubes spaced from one another in a vertical direction are not connected with one another. The groups are arranged substantially parallel to one another. The refrigerant supply conduit 12 is connected simultaneously with all groups so as to supply the liquified refrigerant simultaneously into all groups, while in each group the refrigerant flows in series from one to the other tube of the group. The refrigerant returns through the return conduit 14 to the compressor 10, simultaneously from all groups of the tubes. The heat exchanger in accordance with the present invention is significantly different from a spiral heat exchanger in which there is no time for evaporation of the refrigerant. In the heat exchanger in accordance with the present invention the heat exchange is exceptionally efficient in its small volume since there is a great surface for heat exchanger including, for example as shown in the drawings, eighteen tubes. Any number of tubes can be accommodated in a very small volume. A very considerable quantity of coolant is pumped through the small volume of the heat exchanger.

It will be understood that each of the elements described above, or two or more together, may also find a useful application in other types of constructions differing from the types described above.

While the invention has been illustrated and described as embodied in device for air temperature control in a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A device for air temperature control in a vehicle, comprising means forming a first circuit for circulating a coolant; means forming a second circuit for circulating of a refrigerant; a heat exchanger which provides a heat exchange between the coolant of the first circuit and a refrigerant of the second circuit, said second circuit including a compressor drivable from a main engine and providing circulation of the refrigerant in said second circuit; a thermostat controlling an operation time of said compressor; fan means driven by a motor; a heater core provided in said first circuit; a heater core valve provided in between said heater core and said heat exchanger and controlling a portion of the coolant supplied from said heat exchanger to said heater core, so that a cooling operation of the system is controlled by controlling the operation time of said compressor with said thermostat, controlling the portion of the coolant supplied through said valve from said heat exchanger to said heater core, and blowing air by said fan to said heater core, said heat exchanger including a container through which said coolant is passed, and a plurality of tubes extending through said container and through which the refrigerant is passed, said tubes being arranged so as to form a plurality of groups of tubes with said groups spaced from one another in a vertical direction and not connected with one another, white the tubes within each group are connected in series with one another; a first valve located in said first circuit between an outlet of said heat exchanger and said heater core valve; a second valve located in said first circuit between an outlet of said heater core and an inlet of said heat exchanger; a third valve located between an outlet of said main engine and said heater core valve; a fourth valve located between said heater core and an inlet of said main engine, said first, second, third and fourth valves being operative so that when it is necessary to heat air in a vehicle space said first and second valves are closed and said third and fourth valves are open, and when it is necessary to cool air in a vehicle space said third and fourth valves are closed and said first and second valves are open.

\* \* \* \* \*